US012699927B2

(12) United States Patent
Dykema et al.

(10) Patent No.: US 12,699,927 B2
(45) Date of Patent: Aug. 4, 2026

(54) OVERLAPPING GRADIENT SYNCHRONIZATION IN MACHINE LEARNING

(71) Applicant: SambaNova Systems, Inc., Palo Alto, CA (US)

(72) Inventors: Greg Dykema, Palo Alto, CA (US); Fansheng Cheng, Palo Alto, CA (US); Kuan Zhou, Palo Alto, CA (US); Arnav Goel, Palo Alto, CA (US); Subhra Mazumdar, Palo Alto, CA (US); Milad Sharif, Palo Alto, CA (US); Po-Yu Wu, Palo Alto, CA (US); Bowen Yang, Palo Alto, CA (US); Qi Zheng, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 741 days.

(21) Appl. No.: 18/109,080

(22) Filed: Feb. 13, 2023

(65) Prior Publication Data

US 2023/0259823 A1 Aug. 17, 2023

Related U.S. Application Data

(60) Provisional application No. 63/309,902, filed on Feb. 14, 2022.

(51) Int. Cl.
*G06N 20/00* (2019.01)
(52) U.S. Cl.
CPC .................................... *G06N 20/00* (2019.01)
(58) Field of Classification Search
CPC ...... G06N 20/00; G06N 3/0464; G06N 3/048; G06N 3/098; G06N 3/084; G06N 3/08
See application file for complete search history.

(56) References Cited

U.S. PATENT DOCUMENTS

2021/0303988 A1* 9/2021 Kaplan .................... G06N 3/09

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computing Machinery, 16 pages.

(Continued)

*Primary Examiner* — Matthew Ell
(74) *Attorney, Agent, or Firm* — FP Patents; Sikander M. Khan; Bruce A. Young

(57) ABSTRACT

In a method an orchestrator of a computing system determines that results of Machine Learning model computations are available and dispatches a worker to perform model computations that include computing gradients of the results. The orchestrator determines that a set of gradients of the results is available and dispatches a gradient worker to compute a sum of the gradients. The orchestrator determines that a second set of gradients of the results is available and dispatches a second gradient worker to compute a sum of the second set of gradients. The orchestrator determines that the sums of the first and second gradients are available and dispatches a third gradient worker to compute synchronized gradients. The gradient workers compute the sums and synchronized gradients concurrent with training workers computing additional model computations results and/or gradients. A computer program product can include the method and a computing system can include the orchestrator.

15 Claims, 3 Drawing Sheets

(56) References Cited

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

OVERLAPPING GRADIENT SYNCHRONIZATION IN MACHINE LEARNING

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

U.S. patent application Ser. No. 16/239,252, filed Jan. 3, 2019, entitled "VIRTUALIZATION OF A RECONFIGURABLE DATA PROCESSOR,"; and, U.S. patent application Ser. No. 16/922,975, filed Jul. 7, 2020, entitled "RUNTIME VIRTUALIZATION OF RECONFIGURABLE DATA FLOW RESOURCES,".

PRIORITY BENEFIT CLAIM

This application claims the benefit of U.S. Provisional Patent Application No. 63/309,902 filed Feb. 14, 2022, which is incorporated by reference herein in its entirety.

FIELD OF THE TECHNOLOGY

The technology disclosed relates to computing systems for executing data parallel (DP) computing applications. In particular, the technology disclosed relates to executing DP computing applications using reconfigurable processors, such as coarse-grain reconfigurable (CGR) processors. The technology disclosed further relates to computing gradients in artificial intelligence and machine learning applications.

BACKGROUND

The present disclosure relates to computing systems for executing data parallel (DP) computing applications, such as machine learning. Machine learning applications can include computing gradients in a stochastic gradient descent algorithm. The disclosure further relates to techniques, devices, and structures of a DP computing system suitable for executing machine learning and similar applications and computing gradients. DP systems of the present disclosure can include coarse-grain reconfigurable processors.

BRIEF DESCRIPTION OF THE DRAWINGS

The drawings included in the present disclosure are incorporated into, and form part of, the specification. They illustrate implementations of the present disclosure (hereinafter, "the disclosure) and, along with the description, serve to explain the principles of the disclosure. The drawings are intended to be only illustrative of certain implementations and are not intended to limit the disclosure.

DETAILED DESCRIPTION

Figure 1A:
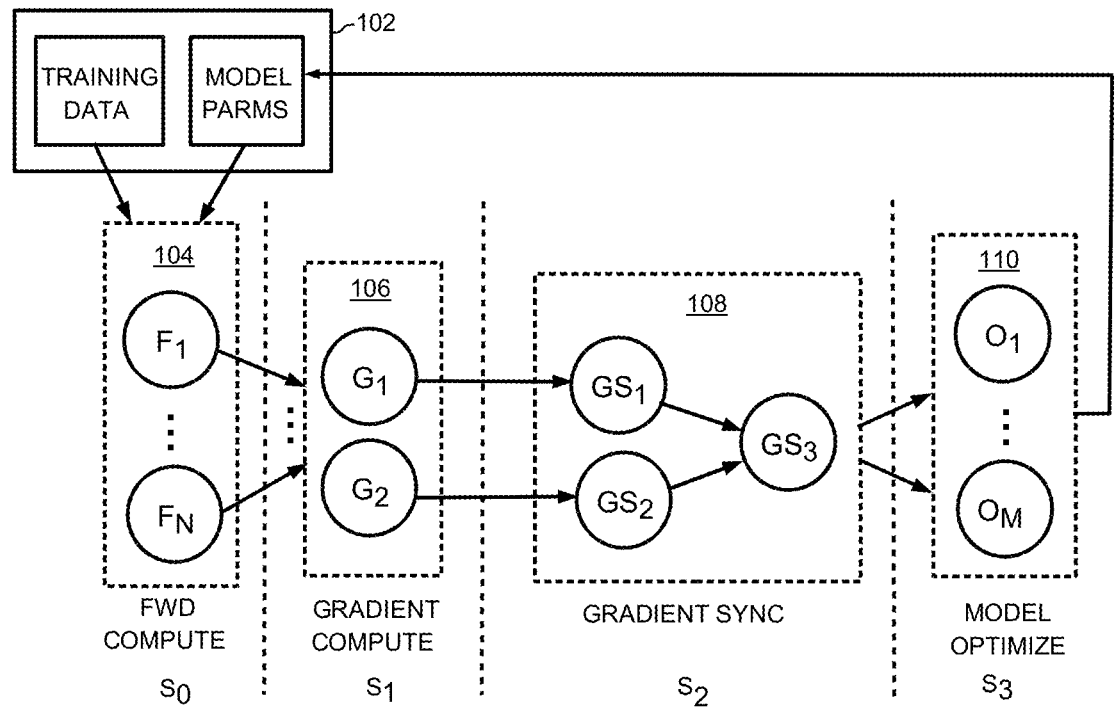
FIG. 1A illustrates an example of training a machine learning model, according to aspects of the disclosure.

Aspects of the present disclosure (hereinafter, "the disclosure") relates to computing systems for training machine learning applications. More particular aspects relate to computing gradients in machine learning algorithms. Other aspects of the disclosure relate to computing gradients in Data-Parallel (DP) computing systems (hereinafter, "DP systems") In examples of the disclosure, DP systems can employ Coarse-Grain Reconfigurable (CGR) processors (CGRPs) designed based on a CGR architecture. DP systems based on, and/or incorporating, CGRPs can be particularly adaptable to, and increasingly efficient in, performing operations of DP applications.

As used herein, the term "CGRP" refers to hardware implementations of processing elements of a computing system based on, or incorporating, a coarse grain reconfigurable architecture. Hardware implementations of CGRPs (e.g., processors, memories, and/or arrays or networks of processors and memories) can comprise one or more Integrated Circuits (ICs), chips, and/or modules. As used herein, the term "chip" refers to an IC (or, combination of ICs) that can implement elements of a CGRP. A chip can typically be packaged in a chip module (e.g., a single chip module, "SCM" or, alternatively, a multi-chip module, "MCM"). In implementations of the disclosure (hereinafter, "implementations"), a CGRP can comprise one or more such ICs, chips, and/or MCMs.

While the disclosure frequently uses the example of a CGRP as a processing element of a DP computing system, the disclosure is not limited to systems employing CGRPs and it will be appreciated by one of ordinary skill in the art that techniques, devices, and systems within the scope of the disclosure can also apply to DP computing systems utilizing processors such as Central Processing Unit (CPUs), Graphics Processing Units (GPUs), Field Programmable Gate Arrays (FPGAs), Digital Signal Processors (DSPs), and/or specialized Application-Specific Integrated Circuits (ASICs) or Application Specific Instruction-set Processor (ASIP). Implementations can comprise a system, method, or article of manufacture.

Aspects of the disclosure can be appreciated through a discussion of example implementations and/or applications of methods and/or systems. However, such examples are for purposes of illustrating the disclosure and are not to limit the disclosure to the example implementations described herein, but to encompass all modifications, equivalents, and alternatives falling within the spirit and scope of the disclosure. Thus, the disclosure is not intended to be limited to the implementations shown but is to be accorded the widest scope consistent with the principles and features disclosed herein. Various modifications to the disclosed examples will be readily apparent to those of ordinary skill in the art, and the general principles defined herein may be applied to other implementations of the disclosure without departing from the spirit and scope of the disclosure.

Implementations that are not mutually exclusive are taught and understood to be combinable. One or more features of an implementation can be combined with other implementations. The disclosure in some instances repeats references to these options. However, omission from some implementations of recitations that repeat these options should not be taken as limiting the combinations taught in the preceding sections—these recitations are hereby incorporated forward by reference into each of the following implementations.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and/or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein. The terms "comprising", "including", and "having" can be used interchangeably herein.

As used herein, "incorporated subject matter" refers, collectively, to subject matter disclosed, and/or otherwise encompassed, among the disclosures incorporated herein by reference. For purposes of illustrating the disclosure, but not intended to limit implementations, various terms of the disclosure are drawn from the incorporated subject matter. As used herein, unless expressly stated otherwise, such terms as may be found in the incorporated subject matter have the same meanings, herein, as their meanings in their respective incorporated disclosures.

Turning now to more particular aspects of the disclosure, some computing applications comprise computations that can be executed concurrently, in parallel, among a plurality of computational elements (processors and/or programs executing on processors, of a DP computing system). Examples of such applications include machine learning (ML) and deep machine learning (DML) methods of Artificial Intelligence (AI) applications; image processing; stream processing (e.g., processing of streaming video and/or audio data); natural language processing (NLP); and/or, recommendation engines. As used herein, the term "DP application" refers to a programming application that can be executed in parallel using multiple processing elements of a DP computing system, such as these examples. Such applications can also execute as pipelines of successive computation stage and, accordingly, as sometimes referred to as "dataflow" applications and DP systems can be configured to execute such pipelines. The terms "DP system" and "DP application", as used herein, are to be understood to include dataflow systems and dataflow applications, respectively, and "dataflow" in reference to computing systems and applications, as used herein, are to be understood to include DP systems and DP applications.

As previously described, DP computing systems can comprise reconfigurable processing elements such as CGRPs— or, more generally, reconfigurable processors ("RPs")— particularly designed and/or configured to efficiently perform DP applications, Prabhakar, et al., "Plasticine: A Reconfigurable Architecture for Parallel Patterns," ISCA '17, Jun. 24-28, 2017, Toronto, ON, Canada, (hereinafter, "Prabhakar") describes example CGRPs and, systems utilizing such CGRPs, that can be particularly advantageous in DP computing system. U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, further illustrate example implementations of DP computing systems (which can include "dataflow" computing systems)

utilizing reconfigurable processors and reconfigurable processor architectures in DP computing systems.

Kumar illustrates an example reconfigurable dataflow system ("RDS"), as also an example of a DP computing system, comprising user applications, programming libraries (e.g., deep learning frameworks), a software development kit, computation graphs associated with user applications, compilers, execution files that can specify operations of a user application to perform using reconfigurable processing resources of the RDS and host and runtime processors. According to the examples of Kumar, user applications can comprise parallel applications (e.g., machine learning "models") and an RDS can comprise a plurality of physical racks each comprising one or more compute nodes (hereinafter, "nodes").

In the examples of Kumar a host and runtime processors can, for example, facilitate compiling a DP application, determining particular RDS resources to execute the application, and managing execution of the RDS resources in performing operations of the application. In the examples of Grohoski and Kumar a node can comprise a host processor, a runtime processor, and reconfigurable processors ("RPs"), and a runtime processor can include kernel drivers and/or a user space library (e.g., a library of programs a user can include, or can invoke, in a DP application and that can execute in a user space of a runtime processor). As used herein, with reference to the examples of Grohoski and Kumar, "CGRP" is used interchangeably with "RP" as recited in Grohoski and Kumar.

In various implementations, a CGRP can comprise reconfigurable processing elements with reconfigurable interconnections. In Grohoski and Kumar, for example, CGRPs can comprise one or more arrays ("tiles") of configurable processors (pattern compute units, "PCUs") and/or memory units (pattern memory units, "PMUs") that are reconfigurable to execute particular computations of a DP application. Examples of Grohoski and Kumar illustrate CGRPs comprising sub-arrays of PCUs/PMUs and CGRPs comprising multiples tiles interconnected by a network.

As illustrated by Kumar and Grohoski, a reconfigurable data-flow unit (RDU) of a DP system can comprise dynamically reconfigurable hardware resources of the system to perform operations of DP applications. RDUs of a DP system can comprise (e.g., be based upon), for example, one or more CGRPs. An RDU can comprise I/O interfaces to enable CGRPs within an RDU and/or among differing RDUs to communicate. In the examples of Kumar and Grohoski an RDU can comprise hardware elements such as clock circuits, control circuits, switches and/or switching circuits, interconnection interface circuits (e.g., processor, memory, I/O bus, and/or network interface circuits, etc.). Kumar also illustrates that an RDU can include virtualization logic and/or CGRP configuration logic. RDUs and/or CGRPs such as described in Prabhakar, Grohoski, and Kumar can implement features and techniques of the disclosure and, accordingly, can serve to illustrate aspects of the disclosure. However, as previously cited, the disclosure is not necessarily limited to computing systems utilizing CGRPs.

In more particular aspects of the disclosure, a DP system can be employed to train a machine learning (ML) application (hereinafter, referred to as an "ML model"). As used herein, the term "ML training application" refers to a computing algorithm, program, and/or hardware of a DP system designed to train a machine learning model. ML training applications can used model training data and model parameters as model training data to train an ML model to compute predicted results to closely match actual data. For example, model training data can comprise one or more images and an ML model can be trained, using the ML training input data and model parameters, to determine the subject of the image (actual data).

ML training applications can comprise neural networks having layers to compute forward, backward, and optimization computations to train the ML model. Forward computations can compute, for example, an "activation function" of the ML model. For example, a common machine learning activation functions is a "weights-bias" function, which can be computed as a sum of products of an activate matrix multiplied by a weights matrix, and the sum of products added to a bias matrix, which can be expressed as [$\Sigma$w a+b], where "w" represents elements of a matrix [W] comprising weight parameters, "a" represents elements of an activation matrix, [A], and "b" represents elements of a bias matrix [B]. [$\Sigma$w a] computes a sum of products of elements "w" of a row of matrix [W] multiplied by corresponding elements "a" of a column of matrix [A], and the resulting sum added to element "b" of a row of matrix [B]. In this example, matrix [A] represents model training data and matrices [W] and [B] represent model parameters.

Backward computations can compute functions to feedback results of successor forward computations to recompute the forward computations using the feedback results. In particular, backward computations can compute updated values of training parameters that improve the accuracy of the forward computations relative to the training data (e.g., improve the accuracy of an ML model to predict the subject of an image, or to predict a phrase in a natural language text). In the example of a weights-bias function, backward computations can update values of weight and bias elements of matrices [W] and [B] to improve results of forward, activation function, computations.

In training ML models, one method of updating model parameters of an ML model application is to compute gradients of the model parameters in a stochastic gradient descent computation. To compute gradients, an ML training system can apply a loss function to results of an activation function to compute gradients of the model parameters, such as gradients of elements of matrices [W] and/or [B]. Gradient descent can compute the updated model parameters, for example, based on minimizing a computational result of the loss function. Computing gradients, and updating model parameters based on the gradients, is referred to herein as "model optimization". The updated (optimized) model parameters can then be fed backward (in a backward computation layer of a neural network, for example) to forward computations (in a forward computation layer of the neural network) to recompute the activation function using the updated parameters to improve the accuracy of the ML model results.

In DP computing systems, computations of an ML training can be executed by ML model training "workers". The training workers can perform a particular set of computations of the ML training application—such as a General Matrix Multiply (GeMM), matrix transposition, matrix convolution of matrices of training data (e.g., matrices of tensor data)—that can be used in forward and backward computations of the model training application. In implementations, a training worker can comprise, for example, programs, specialized hardware (logic) circuits, and/or one or more processing elements of a DP computing system, such as one or more RDUs or CGRPs, configured to execute particular computations of a model training application.

A training worker can comprise RDUs and/or CGRPs of a DP system configured in a particular combination and/or topology based, for example, on particular computations of an ML training application the worker is to perform, and/or a position of the worker in a pipeline topology of training workers. As used herein, "ML training worker" refers to any combination of software and/or hardware (e.g., processors, memories, interconnection circuits, and/or specialized model training circuits) configured to execute computations of an ML training application.

Training an ML model can require extremely large amounts of training data (billions, and even trillions of tensor data elements). A DP system can reduce or optimize ML model training time by splitting ML model training data into non-overlapping batches of data ("minibatches") and executing many independent ML training workers to train the ML model, each processing a particular minibatch of the training data. A DP system can, correspondingly, comprise a large number of processing elements (e.g., a large number of RDUs and/or CGRPs) to execute the ML training workers FIG. 1A illustrates one example of training an ML model among multiple training workers in a DP computing system. A training run (execution) of an ML model can be described as performing a set of training "epochs", performing, in each epoch, forward, backward, and optimization computations to generate optimized model parameters. Successive epochs use results of prior epochs to further train (optimize) the ML model. In FIG. 1A, stages $S_0$ to $S_3$ represent model training stages of one epoch in an ML model training run.

In FIG. 1A, forward layer 104 is shown comprising N number of forward (model training) workers, $F_1$ to $F_N$, that can perform forward computations of the ML model, such as activation functions, using model training data and model parms (model training parameters, such as weights and biases) in model data 102. In implementations, N can be very large, such as tens or hundreds of thousands of forward workers. FIG. 1A illustrates forward workers $F_1$ to $F_N$ as performing forward computations in stage $S_0$ of the ML training epoch. In stage $S_0$ each of forward workers $F_1$ to $F_N$ can compute, in parallel, an activation function on a respective minibatch (among N minibatches) of model training data and corresponding model parms in model data 102.

A backward layer of the model can comprise training workers to perform backward computations of the model that can feedback results of other forward or backward workers to the forward and/or other backward training workers. Some backward training workers can compute gradients of model parameters based on results of training computations of forward and/or other backward training workers. In FIG. 1A, backward layer 106 is shown comprising gradient sync workers $G_1$ and $G_2$. As forward workers in forward layer 104 generate forward computation results, the forward workers can output the results to gradient computation workers $G_1$ and $G_2$ in backward layer 106. In stage $S_1$ of the epoch, using the forward computation results (e.g., matrices of tensor data computed in an activation function) workers $G_1$ and $G_2$ can compute gradients of the model parms of model data 102, such as by computing a loss function using the forward computation results.

While FIG. 1A illustrates only two gradient computation workers, this is for simplicity of the example and not intended to limit implementations. In implementations, similar to distributing forward computations among a large number of forward workers, backward computations, including gradient computations, can be distributed among a large number of backward workers, to perform the backward computations in parallel (including, potentially, in parallel with continuing forward computations). Further, as just described, gradient compute workers can compute gradients based on results of backward as well as forward workers, and gradient compute workers are not limited to computing gradients based only on results of forward workers as illustrated in the example of FIG. 1A.

Prior to performing optimization computations (e.g., stochastic gradient descent computations), as previously described the gradients can be synchronized to optimize the model parameters as a singularly trained model. In FIG. 1A, gradient sync layer 108 is shown comprising gradient sync workers $GS_1$, $GS_2$, and $GS_3$. Similar to the example of backward layer 106, for simplicity FIG. 1A illustrates gradient sync layer 108 as comprising 3 gradient sync workers. However, in implementations, a backward layer can comprise many hundreds or thousands of gradient sync workers. In particular, as the number, N, of minibatches in an epoch can be extremely large, and the number of gradients to synchronize correspondingly extremely large, one method to perform the synchronization uses a collective AllReduce algorithm using the minibatch gradients.

In such an algorithm, gradient sync workers can form a pipeline, with successively fewer workers in each successive stage of the pipeline, with all workers computing partial sums of gradients in parallel and forwarding the partial sums to successive workers in the pipeline. Once the AllReduce algorithm has reduced the sum of the gradients to a single sum of each gradient (i.e., a single sum of gradients of each parameter in the model parameter minibatch) a final successor worker can divide each single sum by N, to produce a synchronized average of each gradient of the minibatch parameters. Thus, in the example of FIG. 1A, in stage $S_2$ of the epoch gradient sync workers $GS_1$ and $G_2$ can compute sums of gradients output by gradient workers in backward layer 106, and can forward the sums to gradient sync worker $GS_3$.

Gradient sync worker $GS_3$. can add the sums and divide the single, total gradient sums by N to compute synchronized gradients of the minibatch of model parms. Gradient sync worker $GS_3$ can output the synchronized gradients to optimization workers $O_1$ to $O_M$ in optimization layer 110 in FIG. 1A. Optimization workers $O_1$ to $O_M$ can apply the gradients to compute optimized values of the model parameters in each of the N model parameter minibatches. The optimization workers can compute optimized model parameters (e.g., elements of matrices [W] and/or [B] in a weights-bias activation function) using the gradients and are shown, in FIG. 1A, as performing the optimization computations in stage $S_3$ of the epoch. The optimization workers can then output (feedback) gradient-optimized model parameters to model parms in model data 102 for subsequent training epochs.

In conventional model training systems, synchronizing gradients is performed only after gradient computations for all N minibatch have completed (that is, only after computations of all N minibatch gradients have completed). Using the example of FIG. 1A, in a conventional ML model training system, gradient sync workers in stage $S_2$ do not begin AllReduce computations until all forward computations in stage $S_0$ needed to compute gradients, and gradient computations in stage $S_1$ to compute gradients of all N model parameter minibatches, are complete. Serializing gradient synchronization in this way increases latency to complete a training epoch, and can further reduce utilization of training system resources (e.g., hardware resources, such as processors and/or memories, to perform the AllReduce that are idle until all gradients have been computed). Additionally, it can be necessary to transfer gradients among the N minibatch gradients from a gradient compute worker (e.g., from a memory utilized by a gradient compute worker) to a gradient sync worker (e.g., to a memory utilized by a gradient sync worker), and/or from one gradient sync worker to a successor gradient sync worker in an AllReduce pipeline.

Further, ML model training systems comprising many thousands of workers and associated hardware resources can have hardware resources physically distributed within a potentially large data center comprising many physical racks of processors, memories, and interconnections (e.g., I/O bus and/or network interconnections) among the processors and/ or memories. In such systems transferring gradients, computed for a very large number (N) of minibatches, among the gradient compute and gradient sync workers can itself add substantial latency to an epoch, and/or substantially reduce utilization of the hardware resources that are idle awaiting transfer of the gradient data.

To overcome such limitations, in implementations a Gradient Sync Overlap (GSO) ML model training system (hereinafter, "GSO training system") can overlap gradient computations and gradient sync computations. As some gradient workers produce gradients, those workers can transfer (or otherwise input) early gradient results to gradient sync workers that can compute intermediate gradient sums of the early gradients. In this way a GSO training system can overlap transfer of gradients from a gradient worker to a gradient sync worker with continuing forward and/or gradient computations, to eliminate epoch execution latency resulting from serialization of gradient computations and gradient sync computations. Similarly, a GSO training system can overlap transfer of intermediate sums among gradient sync workers in an AllReduce computation of synchronized gradients to further eliminate epoch execution latency resulting from serializing transfer of intermediate sums among gradient sync workers.

Figure 1B:
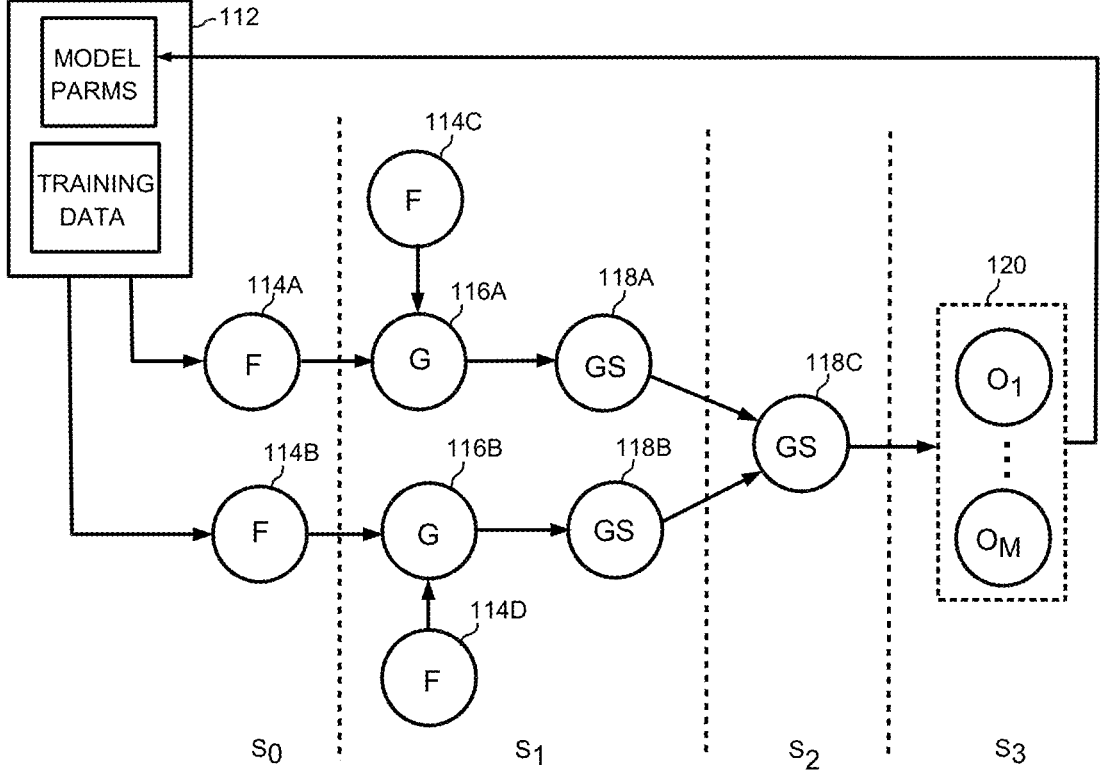
FIG. 1B illustrates an alternative example of training a machine learning model, according to aspects of the disclosure.

FIG. 1B illustrates an example of an ML model training epoch as performed using Gradient Sync Overlap. FIG. 1B depicts forward workers 114A, 114B, 114C, and 114D (collectively, "forward workers 114"); gradient compute workers 116A and 116B (collectively, "gradient compute workers 116"); gradient sync workers 118A, 118B, and 118C (collectively, "gradient sync workers 118"); and M number of optimization workers $O_1$ to $O_M$ (collectively, "optimization workers 120") in optimization layer 120. Forward workers 114 can input minibatches of model training data and corresponding model parameter data from respective training data and model parms in model data 112.

In stage $S_0$ of the training epoch illustrated in FIG. 1B, forward workers 114A and 114B are dispatched to perform forward (e.g., weights-bias activation function) computations. The training system can dispatch gradient compute workers 116 to receive results of the stage $S_0$ forward computations to gradient compute workers 116.

In stage $S_1$ of the epoch, as gradient compute workers 116 receive results of forward computations output from forward workers 114A and 114B, gradient compute workers 116 can begin computing "early" gradients of the minibatch parameters. As these early gradients become available, in stage $S_1$ the training system can dispatch gradient sync workers 118A and 118B to begin (in stage $S_1$) synchronizing the gradients (e.g., computing intermediate gradient sums) in parallel with gradient compute workers 116 computing and/or transferring (e.g., to gradient sync workers 118A and/or 118B) additional gradients.

As intermediate gradient sums become available, the GSO training system can dispatch gradient sync worker 118C to receive and add the intermediate gradient sums in parallel with gradient compute workers 116 computing and/or transferring additional gradients and/or gradient sync workers 118A and 118B computing and/or transferring intermediate gradient sums of the additional gradients. Upon gradient compute workers 116 computing gradients of particular model parameters among all N minibatches, and gradient sync workers 118 computing final gradient sums of the gradients, in stage $S_2$ gradient sync worker 118C can compute the synchronized (averaged) gradients of those model parameters and can transfer (or otherwise communicate) these synchronized gradients to optimization workers among optimization workers 120. In stage $S_3$, optimization workers 120 can compute optimized values of the model parameters corresponding to the synchronized gradients and can update model parms in model data 112 with the optimized values.

Similar to overlapping forward, gradient compute, and gradient sync intermediate computations, and/or transfers of forward results, gradients, and/or intermediate gradient sums, in stage $S_2$ the GSO training system can overlap computations of gradient sync worker 118C to compute synchronized gradients of some model parameters among of the N minibatches with computations of gradient compute workers 116 to compute gradients, and/or computations of gradient sync workers 118A and/or 118B to compute intermediate gradient sums, of other model parameters in among the N minibatches. Additionally, the GSO training system can overlap computations and/or computational results transfer of forward workers 114, gradient compute workers 116, and/or gradient sync workers 118 with optimization computations of optimization workers 120 and/or transfer of optimized model parameters to model parms of model data 112.

While the examples of FIG. 1B depicts different ML training workers, in implementations any two or more workers among the different ML training workers shown in the examples can comprise the same worker, and/or can utilize the same hardware resources (e.g., the same CGRPs, memories, and/or interconnections) of the ML training system.

Communications (e.g., to transfer forward results, gradients, intermediate gradient sums, and/or synchronized gradients) among ML training workers, such as forward workers 114, gradient compute workers 116, and/or gradient sync workers 118, can use different hardware resources than ML model computations (e.g., activation, gradient, gradient averaging, and/or optimization computations), such that, as illustrated in the example of FIG. 1B, gradient data can be transferred concurrently with model computations to reduce overall epoch execution latencies. However, in some GSO training system configurations, computing intermediate results—such as intermediate gradient sums—the same hardware (e.g., processors and/or memories) as used by forward or backward computations that do not depend on the gradients ("gradient-independent" computations).

In such cases, the GSO training system can ⬛ leave (e.g., time multiplex) computing these intermediate results and/or synchronized gradients with gradient-independent computations using the same hardware resources (e.g., processors, memories, and/or communication interconnections). A GSO training system can, for example, suspend or defer execution of one ML training worker using the shared hardware resources to enable another training worker to use the shared hardware resources (e.g., to perform gradient sync computations, and/or to transfer input data to, or output data from, a gradient or gradient sync worker). When the second worker's use of the shared resources is complete, the ML training system can resume or dispatch the suspended/deferred worker to use the shared hardware resources.

To suspend an executing training worker a GSO training system can, for example, interrupt the executing worker and save its execution state, or can wait for an appropriate break point in the worker computations, such as completion of a model section (e.g., a set of gradient-independent forward and/or backward computations). The GSO system can dispatch the worker sharing the hardware resources to execute and, when that worker has completed using the shared resources, can resume a suspended worker or dispatch another worker to use the shared resources.

As certain model training computations (e.g., optimization computations) can depend on gradient and or synchronized gradients, when interleaving training worker execution using shared hardware resources, it can be advantageous for a GSO training system to prioritize gradient computations (e.g., computations of gradients and/or intermediate gradient sums) over gradient-independent computations. Thus, when a gradient worker (a gradient compute or gradient sync worker) shares hardware with a training worker performing gradient-independent computations, a GSO training system can preempt (suspend or defer dispatch) the gradient-independent worker to allow the gradient worker to use the shared hardware resource. When the gradient worker has complete using the shared resources, the GSO system can resume, or dispatch, the preempted worker.

By overlapping some or all of these ML model training operations, a GSO training system can reduce or minimize model training latency (e.g., latency of a training epoch) and/or increase or maximize utilization of hardware resources of the GSO training system in executing an epoch. To achieve such overlap a GSO training system can include a GSO "orchestrator" that can determine types of computations executed in training an ML model and, based on the types of computations, can dispatch ML training workers to perform the computations, and/or transfer training results among the workers so as to overlap the computations and/or transfers. As used herein, "training results" comprise forward computation results, computed gradients, synchronized gradients, and optimized model parameters.

In implementations, a GSO orchestrator (hereinafter, "orchestrator", for brevity) can dispatch training workers, interleave workers, and/or initiate (and/or perform) transfer of training results among model training workers and/or hardware resources (e.g., memories and/or RDUs of a GSO training system). An orchestrator can comprise any combination of software and/or hardware (e.g., processors, memories, interconnection circuits, and/or specialized model training circuits) of a GSO training system. An orchestrator can comprise, for example, programs executed on a host processor of a GSO training system, such as programs included in the example SDK, and executed on the example host processors, of Kumar. An orchestrator can execute on a runtime processor such as illustrated in the example runtime processors of Kumar. An orchestrator can be communicatively or operatively coupled to a runtime processor to orchestrate configuring GSO system hardware resources and/or executing ML training workers.

Figure 2:
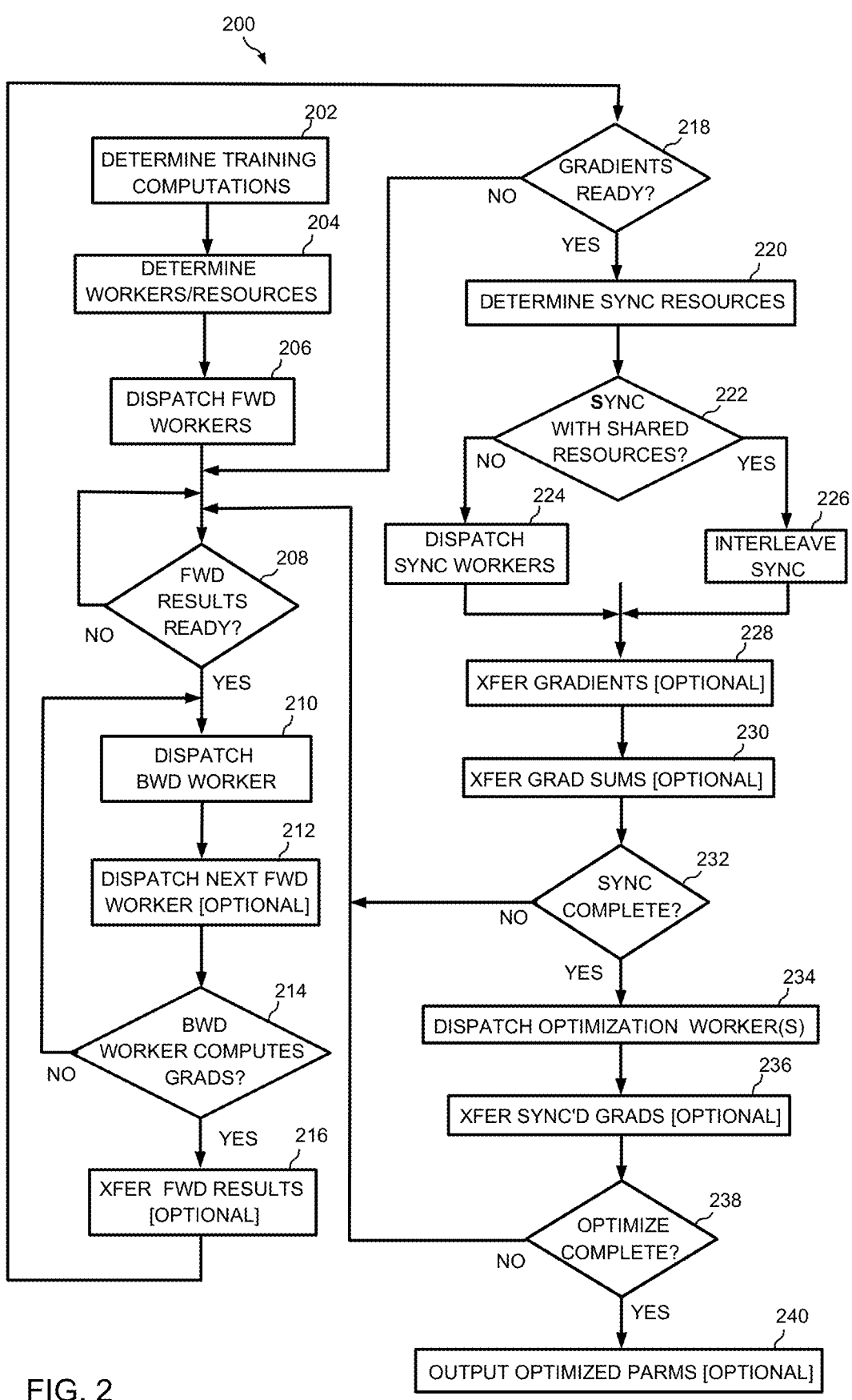
FIG. 2 is flowchart illustrating an example method to synchronize gradients using Gradient Sync Overlap, according to aspects of the disclosure.

FIG. 2 illustrates example method 200 that an orchestrator can perform to manage execution of ML training workers to reduce training latency and/or increase utilization of GSO system hardware resources. To illustrate the method, but not intended to limit implementations, the method is described as performed by a GSO orchestrator (in reference to method 200, "the orchestrator") of a GSO training system (in reference to method 200, "the system") performing one training epoch to train an ML model (in reference to method 200, "the model"). In the method the orchestrator can synchronize gradients computed in the epoch using gradient sync overlap, such as illustrated in the example of FIG. 1B. However, it will be appreciated by one of ordinary skill in the art that operations of the method can be performed, in part or in total, by one or more software and/or hardware components of a GSO training system other than an orchestrator such as used herein to describe the method and can apply to more than one epoch of a training run for training the model.

In describing method 200, "hardware resources" refers to processors, memories, communications interconnections and/or interfaces, specialized training circuits, or any combination of these elements, of the system. Further, In describing method 200 "forward results" refers to results of forward computations (e.g., results of activation functions) computed by forward workers; "gradients" refers to gradients of model parameters associated with the model forward computations, computed by gradient workers; "intermediate gradient sums" refers to sums of gradients of particular parameters, computed by gradient sync workers; "synchronized gradients" refers to particular gradients that have been synchronized, such as by a gradient sync worker computing an average of gradients; and. "optimized parameters" refers to optimized values of model parameters computed by optimization workers using the synchronized gradients.

In operation 202 of method 200, the orchestrator determines training computations included in training the model. For example, in operation 202 the orchestrator can determine forward computations, backward (e.g., gradient and/or model feedback) computations, and/or model optimization computations included in training computations of the model. The orchestrator can determine the training computations using a textual and/or graphical description of the model. A computation graph of the model, for example, can describe the training computations, an order of performing the computations, and/or dependencies of some computations among others among the training computations.

Among the computations included in the training computations of the model, certain computations can produce gradients and other computations can depend on gradients. By analyzing the computation graph (or, simply "graph"), the orchestrator can determine forward and/or backward computations that can produce gradients, and can determine forward, backward computations, and/or model optimizations that depend on gradients (e.g., gradient optimization computations).

In operation 204, based on the training computations determined in operation 202, the orchestrator determines training workers to execute the model training computations, and/or hardware resources of the system used to execute the workers. The workers can be workers to perform a single epoch of the model training or a single section of the model, to perform multiple epochs or multiple sections of the model, or to perform a complete training run.

In operation 206, the orchestrator dispatches one or more forward workers to perform forward computations among the training computations. In operations of the method, "dispatching" a worker can comprise the orchestrator itself initiating execution of a worker or, alternatively, can comprise the orchestrator communicating to another component of the system (e.g., a runtime processor) to initiate execution of a worker.

In operation 208 the orchestrator determines if forward results, computed by one or more of the forward workers dispatched in operation 206, are available for use by backward workers to train the model. The forward results can comprise results of a single minibatch of model data and parameters, a portion of results of a single minibatch of model data and parameters, or partial or total results of multiple minibatches of model data and parameters.

The orchestrator can determine in operation 208 that forward results are available based on a progress indicator. In implementations, a progress indicator can comprise, for example, a status signal or communication (e.g., from one or more training workers) corresponding to forward results being stored or otherwise available to compute gradients; an address of data stored in a memory containing forward results that can be used to compute gradients; execution of a synchronization primitive by a program of the training workers and/or the orchestrator or runtime processor; and/or an interrupt from hardware resources associated with storing forward results (e.g., an interrupt from a memory, DMA controller, or RDU). As used herein, the term "progress indicator" refers to any progress status of a training worker (or, of a set of workers), in combination with any particular means to communicate the status (e.g., an interrupt, data communication, or software process synchronization primitive) that can indicate to an orchestrator, or a component of a GSO training system, that a worker has produced computational results (e.g., forward results) that used as input to a successor worker (e.g., a backward worker that computes gradients using the forward results).

If, in operation 208, forward results are not available, the orchestrator repeats operation 208 pending available forward results. If forward results are available, in operation 210 the orchestrator dispatches one or more backward workers that use the forward results. Optionally (e.g., as a result of hardware resources becoming available, or to perform a subsequent section of the model that does not depend on gradients), in operation 212 the orchestrator can dispatch one or more additional forward workers.

Backward workers among the model training workers can compute functions of a model that depend on forward worker results, such as to perform computations used in a feedback loop of the model. However, some backward workers can comprise gradient compute workers, that can compute gradients of model parameters based on results of forward and/or backward workers. Thus, a backward worker, among the backward workers dispatched in operation 210, can be a backward worker to perform gradient computations.

Accordingly, in operation 214 the orchestrator determines if a backward worker dispatched in operation 210 computes gradients. The orchestrator can make the determination based, for example, on the determination of the training computations in operation 202 and/or the determination of workers in operation 204. If, in operation 214, a backward worker dispatched in operation 210 does not compute gradients, the orchestrator repeats operations 210-214 for other training workers included in workers determined in operation 204.

Alternatively, if the orchestrator determines in operation 214 that a backward worker computes gradients, in operation 216 the orchestrator can, optionally, transfer, or initiate transfer of, some or all of the forward results, determined as available in operation 208, to the backward worker. For example, available forward results can be stored in a memory of, or accessible by, the forward worker that computed them and, in operation 216, the orchestrator can transfer some of all of the forward results from the forward worker memory to a memory or, or accessible to, the backward operation.

The orchestrator can, potentially, take advantage of hardware resources not used by the forward and/or backward workers (or, not used by other executing training workers) to overlap the transfer of the forward results with executing computations of the forward and/or backward workers (and/or computations of other training workers), and/or transfer of other training data and/or training results used or computed in the epoch. In operations 216 "initiating" a transfer of forward results can comprise, for example, directing a runtime processor of the system to configure and/or activate hardware resources of the system to perform the transfer.

In addition to optional operation 216, or if the operator omits performing operation 216, based on determining in operation 214 that the backward worker computes gradients, in operation 218 the orchestrator determines if the backward worker has computed at least some gradients that can be available for gradient synchronization. Similar to operation 214, in operation 218 the orchestrator can determine that the gradients are available based on a progress indicator associated with the backward worker, or can receive a notification (e.g., an interrupt or wakeup of a thread synchronization primitive) to indicate that the gradients are available.

"Early gradients", available for synchronization in operation 218, can comprise gradients of a particular set of model parameters among those of a particular minibatch (e.g., gradients of at least some weights and/or biases among a particular minibatch of N minibatches) such that a gradient sync worker can compute an intermediate gradient sum of the early gradients for later averaging to compute synchronized values of the parameters for all N minibatches. If the orchestrator determines in operation 218 that there are not early gradients available, the orchestrator repeats operations 208-218 for any training workers that are executing or can execute pending gradients becoming available.

If the orchestrator determines, in operation 218, that at least some gradients are available for early synchronization, the orchestrator can initiate synchronizing gradients. Using the example of averaging gradients to synchronize the gradients, some gradient sync workers can compute intermediate sums and one or more other gradient sync workers can average the intermediate sums. For example, one gradient sync worker can compute one intermediate sum of a set of gradients, a second gradient sync worker can compute a second intermediate sum of a set of gradients, a third gradient sync worker (or, alternatively one of the first or second gradient sync workers) can add the intermediate sums and compute a synchronized gradient as an average of the two intermediate sums.

Thus, in operation 220 the orchestrator determines hardware resources for the gradient sync workers to use in computing intermediate gradient sums of the early gradients and synchronizing the gradients based on the intermediate gradient sums. In operation 220 the orchestrator can determine processors, memories, and/or interconnections for use by the gradient sync workers in computing, for example, intermediate gradient sums and a synchronized gradient that is an average of the intermediate sums.

In operation 222 the orchestrator determines if a gradient sync worker is using hardware resources shared with another training worker. If the gradient sync worker does not use shared hardware resources, in operation 224 the orchestrator dispatches a gradient sync worker to begin gradient sync computations to sum gradients among the early gradients. Alternatively, if the gradient sync worker is using hardware resources shared with another training worker, in operation 226 the orchestrator interleaves execution of the gradient sync worker and the other training worker. In operation 226 the orchestrator can interleave execution of the workers as previously described with reference to FIG. 1B (e.g., to preempt the other training worker, dispatch the gradient sync worker using the shared resources, and resume or dispatch the other training worker when the gradient sync worker no longer is using the shared resources).

In operation 228 the orchestrator can, optionally, transfer or initiate transfer of the early gradients from the backward (gradient compute) worker (e.g., from a memory of or accessible to the backward worker) to a gradient sync worker (e.g., to a memory of or accessible to the gradient sync worker). In operation 230 the orchestrator can, optionally, transfer or initiate transfer of the intermediate gradient sums computed by the gradient sync worker using the early gradients from the backward (gradient compute) worker. For example, the orchestrator can transfer or initiate transfer of the intermediate gradient sums from a memory of or accessible to the gradient sync worker to a memory of or accessible to a successor gradient sync worker performing an AllReduce of the intermediate gradient sums.

As described in reference to operation 216, in operations 228 and 230, "initiating" a transfer of intermediate gradient sums can comprise, for example, directing a runtime processor of the system to configure and/or activate hardware resources of the system to perform the transfer. Also similar to operation 216, in operations 228 and/or 230 the orchestrator can, potentially, take advantage of hardware resources not used by the backward worker and/or gradient sync worker (or, not used other executing training workers) to overlap the transfer of the gradients with executing computations of the backward and/or gradient sync workers (and/or computations of other training workers), and/or transfer of other training data and/or training results used or computed in the epoch.

In operation 232 the orchestrator determines if synchronization of gradients of particular parameters among a minibatch of the model data is complete, such that synchronized gradients are available for an optimization worker to compute optimized parameters based on the gradients. For example, in operation 232 that orchestrator can determine if synchronized weights gradients of a particular minibatch is complete such that an optimization worker can compute new weights using the synchronized weights gradients. Similar to operations 208 and/or 218, in operation 232 the orchestrator can determine that synchronized gradients are available based on a progress indicator associated with one or more of the gradient sync workers. The orchestrator can, for example, determine that synchronized gradients are available based on a progress indicator associated with AllReduce computations (e.g., computations of intermediate gradient sums) of synchronized gradients.

If the orchestrator determines, in operation 232, that synchronized gradients are not yet available, the orchestrator repeats operations 208-232 for any training workers that are executing or can execute pending synchronized gradients becoming available. Alternatively, if the orchestrator determines, in operation 232, that at least some synchronized gradients are available, in operation 234 the orchestrator dispatches one or more optimization workers to compute optimized values of the model parameters corresponding to the synchronized gradients. The optimization worker(s) can, for example, utilize the synchronized gradients in a stochastic gradient descent computation to compute optimized values of the corresponding model parameters.

In operation 236, the orchestrator can, optionally, transfer or initiate transfer of the available synchronized gradients to the optimization worker(s). Similar to operations 216, 228, and 230, "initiating" a transfer of synchronized gradients can comprise, for example, directing a runtime processor of the system to configure and/or activate hardware resources of the system to perform the transfer. Also similar to operations 216, 228, 230 the orchestrator can, potentially, take advantage of hardware resources not used by the gradient sync workers and/or the optimization workers (or, not used other executing training workers) to overlap the transfer of the synchronized gradients with executing computations of the gradient sync worker, the optimization workers, and/or other training workers, and/or with transfer of other training data and/or training results used or computed in the epoch.

In operation 238 the orchestrator determines of optimization is complete. For example, in operation 238 the orchestrator can determine if optimized model parameters of all minibatches in the epoch have been computed. As described in reference to operation 232, for example, the orchestrator can determine, in operation 238, if optimization is complete based on a progress indicator associated with one or more of optimization workers.

If the orchestrator determines, in operation 238, that optimization is not yet complete, the orchestrator repeats operations 208-238 for any training workers that are executing or can execute pending optimization completion. Alternatively, if the orchestrator determines in operation 238 the optimization is complete, in operation 240 the orchestrator optionally outputs, or initiates output, of the optimized model parameters. In operation 240 the orchestrator can determine to output, or initiate output of the optimized parameters, for example, to a memory accessible or used by forward operators to compute new forward results utilizing the optimized parameters. The orchestrator can determine to output, or initiate output of the optimized parameters, for example, to a storage medium to retain the optimized parameters for a subsequent epoch utilizing the same minibatches.

Alternatively, in operation 240 the orchestrator can determine to not output the optimized parameters based, for example, on the optimization workers having output the optimized model parameters (e.g., to model parameters included in the totality of the minibatches computed in the epoch). The orchestrator can determine to not output the optimized parameters based on forward workers executable, or executing, that can perform forward computations using the optimized parameters, such as to perform a successive epoch for the same set of minibatches while the optimized parameters are available in memories of, or accessible to the forward workers.

Figure 3:
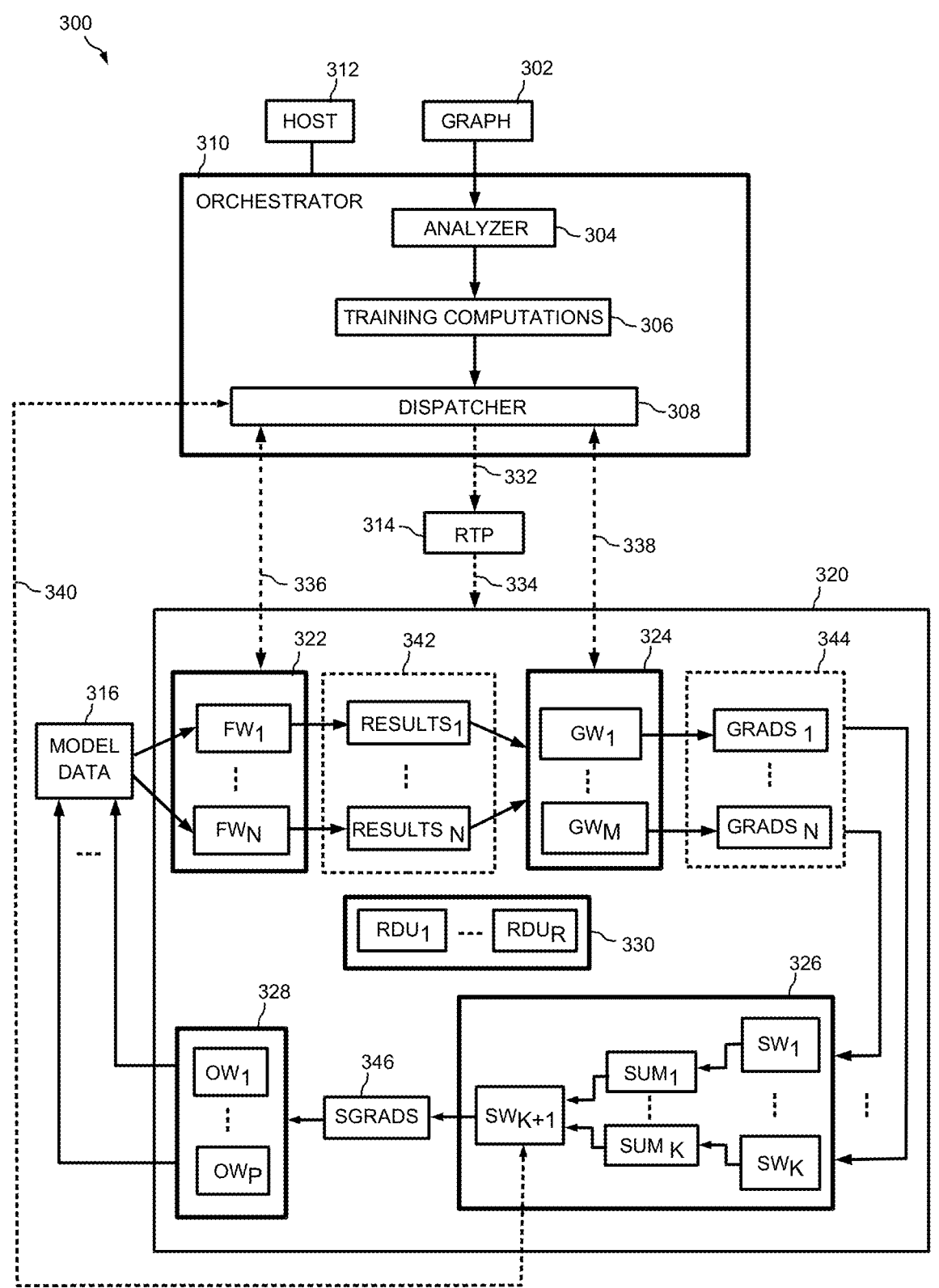
FIG. 3 is a block diagram illustrating an example machine learning computing system using Gradient Sync Overlap, according to aspects of the disclosure.

By performing a method such as method 200, a GSO training system can overlap computations of early gradients, and/or computation of intermediate gradient sums using early gradients, with other model training computations. Similarly, a GSO training system can take advantage of hardware resources not used for model training computations to transfer early forward results, early gradients, and/or early intermediate sums among model training workers. Overall, such overlapping computations and data transfer can reduce model training latency and/or increase utilization of system hardware resources during a model training run;

As described with the example of method 200, a GSO training system can include an orchestrator, and/or alternative components that can perform functions of an orchestrator, to overlap gradient and/or gradient synchronization computations and/or data transfer with other model computations and/or transfers of training data and/or training results. FIG. 3 illustrates example GSO computing system 300 that can train an ML model using a method, or operations of a method, similar or equivalent to method 200, and particularly using gradient sync overlap in training the model.

In FIG. 3 GSO training system 300 (hereinafter, "system 300") is shown comprising host 312, graph 302, node 320, runtime processor RTP 314, and orchestrator 310. System 300 can comprise, for example, a reconfigurable dataflow system such as illustrated in the examples of Kumar. Host 312 can comprise, for example, a host processor such as illustrated in the examples of Kumar (e.g., the example of a host processor in Kumar FIG. 3). Orchestrator 310 can comprise a GSO orchestrator, and can include software programs to orchestrate gradient sync operations. Programs of orchestrator 310 (to be described further on) can execute on processors of host 312, for example.

While not all shown explicitly in FIG. 3, in implementations system 300 can comprise hardware resources such as memories and/or storage devices; processors such as CPUs, GPUs, TPUs, and/or CGRPs; I/O links and/or buses interconnecting processors and memories; and/or, networks and/or interconnection fabrics interconnecting hardware resources. As used herein, the term "hardware resources" refers to such resources interchangeably as individual resources (except where a hardware resource is particularly identified) and hardware resources of the system collectively.

While also not shown explicitly in FIG. 3, in implementations system 300 can further include software elements, such as a software development kit, a runtime library, a user space framework, compilers, ML model evaluation tools, runtime schedulers, operating system kernels, and/or I/O device drivers. As used herein, the term "system software" refers to such software components interchangeably as individual components (except where a component is particularly identified) and software components of the system collectively.

In implementations, graph 302 can comprise a graphical description of an ML model (hereinafter, with reference to FIG. 3, "the model") for training by system 300. Graph 302 can comprise, for example, a computation graph describing training computations of the model, ML training workers to execute the training computations, and/or hardware resources and/or system software of system 300 to execute the training workers to train the model. Graph 302 can, additionally or alternatively, comprise a textual description of the model and/or elements of system 300 for training the model.

Node 320 can comprise a node of a reconfigurable dataflow system, such as described in the example of Kumar (e.g., nodes among 1022 and 1024 of Kumar FIG. 10). In FIG. 3, node 320 is shown comprising R number of RDUs, $RDU_1$ to $RDU_R$ as RDUs330. RDUs330 can comprise reconfigurable dataflow units such as described in the examples of Kumar, and can include, for example, processors (e.g., PCUs), memories (e.g., PMUs), and interconnections among the processors and memories (e.g., array level networks, PCI-Express links, and/or top-level networks). ML training workers of system 300 can execute on the RDUs to perform training computations, for example.

Node 320 is further shown in system 300 comprising workers 322, 324, 326, and 328 (collectively, "workers 320"), which can comprise model training workers to train a model represented by graph 302. Workers 322 are shown comprising N number of forward workers, $FW_1$ to $FW_N$; workers 324 are shown comprising M number of gradient computes workers, $GW_1$ to $GW_M$; workers 326 are shown comprising K+1 number of gradient sync workers, $SW_1$ to $SW_{K+}1$; and, workers 328 are shown comprising P number optimization workers, $OW_1$ to $OW_P$. While not shown in FIG. 3, workers 320 can include backward workers, such as workers that compute feedback functions of the model. Workers among workers 320 can utilize hardware resources of system 300 to perform computations and/or other operations (e.g., transfer of model input data and/or computational results) associated with train the model.

FIG. 3 further depicts system 300 comprising model data 316, which can comprise (not shown explicitly in FIG. 3) model training data and model parameters, such as previously described with reference to FIGS. 1B and 2. Forward workers among $FW_1$ to $FW_N$ can perform forward training computations (e.g., activation functions) each using, for example, one of N number of minibatches of model data 316 (e.g., minibatches each comprising a one $N^{th}$ portion of model training data and corresponding model parameters of model data 316). Forward workers among workers 322 can output results of forward computations to forward results 342, shown in FIG. 3 as comprising N number of forward results, $results_1$ to $results_N$, which can correspond, respectively, to each of the N number of minibatches.

Gradient compute workers among workers 324 can compute gradients of model parameters, included in model data 316, among the N number of minibatches. Gradient compute workers among workers 324 can output computed gradients to gradients 344, shown in FIG. 3 as comprising N number of gradients, $grads'$ to $grads_N$, which can correspond, respectively, to gradients of the model parameters included in each of the N number of minibatches.

Gradient sync workers among workers 326 can compute intermediate sums of gradients included among gradients 344 and, ultimately, can compute synchronized gradients based on gradients 344. Gradient sync workers 326 can, for example, perform an AllReduce algorithm to compute synchronized gradients of particular model parameters included in the N minibatches. Gradient sync workers among workers $SW_1$ to $SW_K$ can form a pipeline to perform an AllReduce of the gradients for computing an average. For example, gradient workers $SW_1$ to $SW_J$, among workers $SW_1$ to $SW_K$ can compute J number of intermediate sums of the N number of gradients of a particular model parameter in the N minibatches, shown in FIG. 3 as $SUM_1$ to $SUM_K$ of workers 326.

Gradient workers $SW_1$ to $SW_J$ can each compute respective intermediates sums, $SUM_K$ to $SUM_J$, among intermediate sums $SUM_1$ to $SUM_K$. Gradient workers $SW_1$ to $SW_J$ can output their respective intermediate sums $SUM_1$ to $SUM_J$ to successor workers among workers $SW_{J+1}$ to $SW_K$ (which can be, or can comprise workers among workers $SW_1$ to $SW_J$). The successor workers can compute successive intermediate sums by adding intermediate sums among sums $SUM_1$ to $SUM_J$ and can output the successive intermediate sums to yet another set of workers among workers 326 (which can be, or can comprise workers among any of workers $SW_1$ to $SW_K$ and/or $SW_{K+1}$). Ultimately, gradient sync worker $SW_{K+1}$, among workers 326 can compute (or, can receive) a total sum of all the intermediate sums, comprising a sum of N number of gradients of a particular model parameter in the N minibatches, and divide the total sum by N to compute synchronized (e.g., average) values of the N gradients.

In this manner, workers 324 and 326 can compute N number of gradients of each particular parameter among the N minibatches (e.g., each instance of a weight and bias in N instances of weights and biases included in the N minibatches). Workers 326 (e.g., worker $SW_{K+!}$) can output the synchronized gradient(s), shown as sgrads 346 in FIG. 3, for use by workers 328 to compute optimized values of the corresponding model parameters. Workers among workers $OW_1$ to $OW_N$ can compute the optimized parameters values based on the synchronized gradients and can output the optimized parameters to corresponding parameters of model data 316, such that the optimized parameters can be utilized in a successive model training epoch to produce a more accurately trained version of the model.

In system 300, RTP 314 can comprise, for example, a runtime processor such as described in the examples of Kumar (e.g., runtime processor 166 in FIG. 3 of Kumar, or as shown in the example of FIG. 10 of Kumar). RTP 314 can, for example, manage configuration of RDUs to execute training workers; initiate and/or manage transfer of data among memories of RDUs 330, host 312, and/or RTP 314; and/or initiate and/or manage execution of training workers using RDUs 330 and/or other hardware resources of system 300.

Orchestrator 310, in system 300, can operate to dispatch and/or manage model workers of node 320 to perform a training epoch of the model. In particular, orchestrator 310 can operate to dispatch and/or manage model workers of node 320 so as to overlap gradient sync computations and/or transfer of forward results and/or gradient data and intermediate gradient sums with other computations (e.g., other forward, backward, and/or optimization computations) of a model training run (e.g., of one or more epochs of a model training run). For example, orchestrator 310 can perform a method, or operations of a method, similar to method 200 of FIG. 2 to overlap gradient sync computations and/or data transfers with other model training computations and/or data transfer.

In implementations, orchestrator 310 can analyze graph 302 to determine, for example training computations for training the model, shown in FIG. 3 as training computations 306. A GSO orchestrator (or, system 300 more broadly) can comprise an analyzer component (or, function) shown in FIG. 3 as analyzer 304, that can analyze graph 302. Analyzer 304 can comprise, for example, one or more programs of orchestrator 310 (and/or specialized hardware circuits) that can analyze graph 302 and can determine training computations of the model, training workers to execute among workers 320, and/or hardware resource of system 300 to execute workers among workers 322. Programs of analyzer 304 can be included in a software stack, and/or a runtime library, of system 300. Programs of analyzer 304 can use memories of host 312, and/or can execute on processors of host 312, for example.

Computations among training computations 306 can comprise, for example, gradient-independent computations (e.g., forward and/or backward computations that do not use gradients), gradient-dependent computations (e.g., backward computations that use gradients), and computations that produce gradients (e.g., computations to compute gradients and/or synchronized gradients). Analyzer 304 can determine such training computations from graph 302 and can determine training workers to perform the particular types of computations among training computations 306.

Orchestrator 310 can comprise a dispatcher component (or, function), shown in FIG. 3 as dispatcher 308. Dispatcher 308 can comprise a component (e.g., one or more programs and/or specialized hardware circuits) of orchestrator 310 (or, system 300 more broadly) to dispatch training workers among workers 322, 324, 326, and/or 328 to execute (e.g., using RDUs among RDUs 330 and/or other hardware resources of system 300) the training computations. Dispatcher 308 can comprise, for example, one or more programs of orchestrator 310 that can interact with runtime processor RTP 314 to schedule or initiate execution of training workers among workers 322, 324, 326, and/or 328. Programs of dispatcher 308 can be included in a software stack, and/or a runtime library, of system 300. Programs of dispatcher 308 can use memories of host 312, and/or can execute on processors of host 312 for example.

Based on training computations 306, training workers, and/or hardware resources to execute the workers, as determined by analyzer 304, dispatcher 308 can determine relationships among the workers and sequences in which to execute particular workers. Dispatcher 308 can determine model training workers that can be executed independent of gradient computations, workers that generate gradients and/or synchronized gradients, and workers that utilize gradients (e.g., optimization workers utilizing synchronized gradients to compute gradient optimized model parameters). Dispatcher 308 can dispatch the various workers based on such dependencies, and can do so with a goal to minimize model training execution, and/or to maximize utilization of hardware resources of system 300, for N number of minibatches in a model training run.

For example, system 300 can execute forward workers among workers 320 (e.g., workers among workers 322) when corresponding hardware resources are available (e.g., allocated by RTP 314) to execute the forward workers. System 300 can execute backward workers among workers 320 when corresponding hardware resources are available and as forward workers generate forward results for the backward workers to process.

Similarly, system 300 can execute gradient compute workers among workers 324 as forward workers generate forward results for workers 324 to compute gradients. In particular, system 300 can execute workers among workers 324 to compute early gradients as forward workers generate initial forward results, can execute workers among workers 324 concurrent with forward workers among workers 322 computing additional forward results, and need not defer execution of gradient workers until the forward workers have computed all N forward results for N number of minibatches.

System 300 can execute gradient sync workers among workers 326 as gradient workers among workers 324 produce early gradients. In particular, system 300 can execute gradient sync workers among workers 326 to compute early intermediate gradient sums as the gradient workers generate initial gradients, concurrent with gradient workers among workers 326 computing additional gradients, and need not defer execution of gradient sync workers until the gradient workers have computed all N gradients values of a particular model parameter.

Dispatcher 308 can dispatch workers among workers 320 to perform these computations using gradient sync overlap to reduce execution latency and/or increase hardware utilization. Additionally, dispatcher 308 can initiate transfer of training results to overlap computations and/or transfer of training data and/or training results during model training epochs, such as described in the example of method 200 of FIG. 2. Dispatching workers among workers 320 can comprise dispatcher 308 communicating (action 332 in FIG. 3) to RTP 314, for example, to schedule and/or initiate execution (action 334 in FIG. 3) of particular workers. Alternatively, or additionally, dispatcher 308 can itself schedule and/or initiate execution of particular workers.

Dispatcher 308 can dispatch workers based on, or in response to, a determination that particular computational results are available. For example, dispatcher 308 can dispatch gradient workers among workers 324 based on a determination that at least some, "early" forward results of a minibatch are available to compute gradients. Similarly, dispatcher 308 can dispatch gradient sync workers among workers 326 based on a determination that at least some, "early" gradients are available to compute intermediate gradient sums of an AllReduce computation, and can dispatch optimization workers among workers 328 based on a determination that at least some, "early" synchronized gradients are available to compute optimized values of some model parameters among the N minibatch parameters.

Dispatcher 308 can make such determinations, for example, by monitoring a progress status of the workers, monitoring a memory to contain training results, based on a synchronization primitive of the workers, and/or based on an interrupt from a worker or hardware resources used by a worker. In FIG. 3, progress indicator 336 represents a progress indicator to dispatcher 308 that workers among workers 322 have produced at least some forward results usable for gradient computations. Progress indicator 336 can, additionally, indicate particular early forward results available, among results 342, to compute gradients.

In implementations, a progress indicator, such as progress indicator 336, can comprise, for example, a status signal or communication (e.g., from workers 322 or RTP 314) corresponding to forward results being stored among results 342; an address of data stored in a memory containing results 342; execution of a synchronization primitive by a program of workers among workers 322 and/or RTP 314; and/or an interrupt from hardware resources associated with storing forward results among results 342 (e.g., an interrupt from a memory, DMA controller, or RDU).

Based on progress indicator 336, dispatcher 308 can determine that forward results are available among results 342 such that dispatcher 308 can dispatch workers among workers 324 to compute early gradients using the available forward results. Based on progress indicator 336, dispatcher 308 can dispatch workers among workers 324 to particularly overlap early gradient computations and/or transfer among workers 320 of forward results, among results 342, and/or gradients among gradients 344, with other model training computations and/or transfer of training data and/or training results among training workers and/or hardware resources of system 300.

In FIG. 3, progress indicator 338 represents a progress indicator to dispatcher 308 that workers among workers 324 have produced at least some early gradients available, among gradients 344, to begin gradient synchronization. Progress indicator 338 can comprise, for example, a progress indicator similar or equivalent to progress indicator 336 to indicate that early gradients are available, and can indicate particular early gradients available, among gradients 344, to compute early intermediate gradient sums. Based on progress indicator 338, dispatcher 308 can determine that early gradients are available among gradients 344 such that dispatcher 308 can dispatch workers among workers 326 to compute intermediate gradient sums using the early gradients. Based on progress indicator 336, dispatcher 308 can particularly overlap intermediate gradient sum computations, and/or transfer among workers 320 of gradients among gradients 344, and/or intermediate gradients sums among sums $SUM_1$ to $SUM_K$ of gradient sync workers 326, with other model training computations and/or transfer of training data and/or training results among training workers and/or hardware resources of system 300.

Progress indicator 340, in FIG. 3, represents a progress indicator to dispatcher 308 that workers among workers 326 have produced at least some synchronized gradients, among sgrads 346, such that dispatcher 308 can dispatch workers among workers 328 to begin optimization computations. Progress indicator 340 can comprise a progress indicator similar or equivalent to progress indicators 336 and/or 338, to indicate that synchronized gradients are available, and can indicate particular synchronized gradients available, among sgrads 346, to compute optimized model parameters.

Based on progress indicator 340, dispatcher 308 can determine that synchronized gradients are available among sgrads 346 such that dispatcher 308 can dispatch workers among workers 328 to compute optimized model parameters using the synchronized gradients. Based on progress indicator 340, dispatcher 308 can particularly overlap model optimization computations and/or transfer among workers 320 of synchronized gradients among sgrads 346, and/or transfer of optimized model parameters to model data 316, with other model training computations and/or transfer of training data and/or training results among training workers and/or hardware resources of system 300.

By overlapping model training computations, and/or transfer of training data and/or training results among training workers and/or hardware resources of system 300, based on soonest availability of forward results, gradients, intermediate gradient sums, synchronized gradients, and optimized model parameters, dispatcher 308 (and, system 300 overall) can reduce model training latency and/or increase system hardware utilization during model training.

Implementations can comprise a computer program product and can include a computer readable storage medium (or media) having computer readable program instructions of the computer program product incorporated therein. It will be understood by one of ordinary skill in the art that computer readable program instructions can implement each or any combination of operations and/or structure of the disclosure, such as illustrated by the drawings and described herein.

The computer readable program instructions can be provided to one or more processors, and/or other elements, of a computing system or apparatus to produce a machine which can execute, via the processor(s), to implement operations and/or actions similar or equivalent to those of the disclosure. The computer readable program instructions can be stored in a computer readable storage medium that can direct one or more processors, and/or other elements, of a computing system or apparatus to function in a particular manner, such that the computer readable storage medium comprises an article of manufacture including instructions to implement operations and/or structures similar or equivalent to those of the disclosure.

The computer readable program instructions of the computer program product can cause one or more processors to perform operations of the disclosure. A sequence of program instructions, and/or an assembly of one or more interrelated programming modules, of the computer program product can direct one or more one or more processors and/or computing elements of a computing system to implement the elements and/or operations of the disclosure including, but not limited to, the structures and operations illustrated and/or described in the present disclosure.

A computer readable storage medium can comprise any tangible (e.g., hardware) device, or combination of tangible devices, that can store instructions of the computer program product and that can be read by a computing element to download the instructions for use by a processor. A computer readable storage medium can comprise, but is not limited to, electronic, magnetic, optical, electromagnetic, and/or semiconductor storage devices, or any combination of these. A computer readable storage medium can comprise a portable storage medium, such as a magnetic disk/diskette, optical disk (CD or DVD); a volatile and/or non-volatile memory; a memory stick, a mechanically encoded device, and any combination of these. A computer readable storage medium, as used herein, is not to be construed as being transitory signals per se, such as electrical signals transmitted through a wire, radio waves or other freely propagating electromagnetic waves, or electromagnetic waves propagating through a wave transmission medium (e.g., a wave guide or fiber-optic cable).

The computer readable program instructions can be communicated from the computer readable storage medium to the one or more computing/processing devices, via a programming API of a computing system, and/or a communications interface of a computing system, having access to the computer readable storage medium, and/or a programming API of a computing system, and/or a communications interface of the one or more computing/processing devices. The API(s) and/or communications interface(s) can couple communicatively and/or operatively to a network, such as the Internet, a local area network, a wide area network, and/or a wireless network. The API(s) and/or communications interface(s) can receive the computer readable program instructions read from computer readable storage medium and can forward the computer readable program instructions to the one or more computing/processing devices via the API(s), communications interface(s), and/or network.

In implementations, the computer readable program instructions of the computer program product can comprise machine language and/or assembly language instructions, instruction-set-architecture (ISA) instructions, microcode and/or firmware instructions, state-setting data, configuration data for integrated circuitry, source code, and/or object code. The instructions and/or data can be written in any combination of one or more programming languages.

The computer readable program instructions can execute entirely, or in part, on a user's computer, as a stand-alone software package; partly on a user's computer and partly on a remote computer; or, entirely on a remote computer. A remote computer can be connected to a user's computer through any type of network, including a local area network (LAN) or a wide area network (WAN). In implementations, electronic circuitry including, for example, FPGA, PLAs, and or CGRPs can execute the computer readable program instructions by utilizing state information of the computer readable program instructions to configure the electronic circuitry to perform operations or elements of the disclosure, such as illustrated by the drawings and described herein.

In implementations, computer readable program instructions can also be loaded onto a computing system, or component(s) thereof, to cause the computing system and/or component(s) thereof to perform a series of operational steps to produce a computer implemented process, such that the instructions which execute on the computing system, or component(s) thereof, implement the operations or elements of the disclosure, such as illustrated by the drawings and described herein.

The flowchart and block diagrams in the Drawings and Incorporations illustrate the architecture, functionality, and operation of possible implementations of systems, methods, and computer program products according to various implementations. Individual elements illustrated in the Figures— such as individual operations illustrated in the flowcharts or individual blocks of block diagrams—may represent a module, segment, or portion of executable instructions for implementing the disclosed function(s). In various alternative implementations, particular operations may occur in an order differing from that illustrated in the examples of the drawings. For example, two operations shown in succession in a diagram of the disclosure may, in a particular implementation, be executed substantially concurrently, or may sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

Terminology used herein, and the examples disclosed, are chosen to illustrate the principles of the implementations, the practical application or technical improvement over alternative technologies, and to enable others of ordinary skill in the art to understand the implementations disclosed herein. The disclosure illustrates various example implementations, and the examples are intended to illustrate principles and aspects of the disclosure, but are not intended to limit implementations, nor intended to be exhaustive of implementations that may be conceived within the scope of the disclosure. It would be apparent to one of ordinary skill in the art that alternative implementations can comprise modifications and combinations within the spirit of the disclosure and the scope of the claims.

As can be seen in the foregoing examples, features of the disclosure can comprise methods and apparati of computing systems. A summary of example implementations of such features includes:

Example Implementation 1

A method comprises: determining, by a Gradient-Sync Overlap (GSO) orchestrator included in a computing system, model training computations associated with training a Machine Learning (ML) model; determining, by the GSO orchestrator, that results of first model computations are available to compute gradients of model parameters utilized to train the ML model, the first model computations among the model training computations and performed by a first training worker among a plurality of model training workers included in the computing system; dispatching, by the GSO orchestrator, responsive to the determining that results of the first model computations are available to compute gradients, a first gradient compute worker, among the plurality of model training workers, to compute, using the results of the first model computations, a first set of gradients; determining, by the GSO orchestrator, that the first set of gradients is available to synchronize; and, dispatching, by the GSO orchestrator, responsive to the determining that the first set of gradients is available to synchronize, a first gradient sync worker to compute, based on the first set of gradients, concurrent with the first gradient compute worker computing a second set of gradients, a first gradient sum comprising a sum of gradients among the first set of gradients.

Example Implementation 2

The example of implementation 11, wherein the method further comprises:
determining, by the GSO orchestrator, that results of second model computations, are available to compute gradients, the second model computations among the model training computations and performed by a second training worker among the plurality of model training workers; dispatching, by the GSO orchestrator, responsive to the determining that results of the second model computations are available to compute gradients, a second gradient compute worker, among the plurality of model training workers, to compute, using the results of the second model computations, a second set of gradients; determining, by the GSO orchestrator, that the second set of gradients is available to synchronize; and, dispatching, by the GSO orchestrator, responsive to the determining that the second set of gradients is available to synchronize, a second gradient sync worker to compute, based on the second set of gradients, concurrent with one of the first gradient compute worker and the second gradient compute worker computing a third set of gradients, a second gradient sum comprising a sum of gradients among the second set of gradients.

Example Implementation 3

The example of implementation 2, wherein the method further comprises:
determining, by the GSO orchestrator, that the first gradient sync worker has computed the first gradient sum and that the second gradient sync worker has computed the second gradient sum; and, dispatching, by the GSO orchestrator, responsive to the determining that the first gradient sync worker has computed the first gradient sum and that the second gradient sync worker has computed the second gradient sum, a third gradient sync worker, among the plurality of model training workers, to compute a first synchronized gradient using the first gradient sum and the second gradient sum.

Example Implementation 4

The example of implementation 3, wherein the method further comprises: determining, by the GSO orchestrator, that the third gradient sync worker has computed the first synchronized gradient; and, dispatching, by the GSO orchestrator, responsive to the GSO orchestrator determining that the third gradient sync worker has computed the first synchronized gradient, an optimization worker, among the plurality of model training workers, to compute, concurrent with the third gradient sync worker computing a second synchronized gradient, an optimized model parameter included in the model parameters.

Example Implementation 5

The example of implementation 3, wherein the method further comprises: determining, by the GSO orchestrator, that one of the first gradient sync worker, the second gradient sync worker, and the third gradient sync worker is to use first hardware resources among hardware resources of the computing system; determining, by the GSO orchestrator, that a training worker, among the plurality of model training workers, is to use second hardware resources among the hardware resources of the computing system; determining, by the GSO orchestrator, that the first hardware resources comprise at least some of the second hardware resources; and, interleaving, by the GSO orchestrator, responsive to the determining that the first hardware resources comprise the second hardware resources, use of the second hardware resources by the training worker and use of the second hardware resources by the one of the first gradient sync worker, the second gradient sync worker, and the third gradient sync worker.

Example Implementation 6

The example of implementation 5, wherein the method of the GSO orchestrator interleaving the use of the second hardware resources by the training worker and use of the second hardware resources by the one of the first gradient sync worker, the second gradient sync worker, and the third gradient sync worker comprises preempting, by the GSO orchestrator, the use of the second hardware resources by the training worker, and dispatching, by the GSO orchestrator, the one of the first gradient sync worker, the second gradient sync worker, and the third gradient sync worker.

Example Implementation 7

The example of implementation 1, wherein the first training worker is configured to perform the first model computations using first hardware resources among hardware resources of the computing system; wherein the first gradient compute worker is configured to compute the first set of gradients using second hardware resources among the hardware resources of the computing system; and, wherein the method further comprises initiating, by the GSO orchestrator, a transfer of a portion of the results of the first model computations available to compute gradients from the first hardware resources to the second hardware resources, the GSO orchestrator initiating the transfer to occur concurrently with the first training worker performing second model computations among the model training computations.

Example Implementation 8

The example of implementation 1, wherein the first gradient compute worker is configured to compute the first set of gradients using first hardware resources among hardware resources of the computing system; wherein the first gradient sync worker is configured to compute the first gradient sum using second hardware resources among the hardware resources of the computing system; and, wherein the method further comprises initiating, by the GSO orchestrator, a transfer of second gradients, among the first set of gradients, from the first hardware resources to the second hardware resources, the GSO orchestrator initiating the transfer to occur concurrently with first gradient compute worker computing first gradients among the first set of gradients.

Example Implementation 9

The example of implementation 1, wherein computing system comprises a runtime component configured to execute training workers, among the plurality of model training workers, using hardware resources of the computing system; and, wherein the method of the GSO orchestrator dispatching the first gradient sync worker comprises the GSO orchestrator communicating to the runtime component to execute the first gradient sync worker using the hardware resources of the computing system.

Example Implementation 10

A computer program product comprises a computer readable storage medium having program instructions embodied therewith, wherein the program instructions are executable by at least one processor to cause the at least one processor to: determine model training computations associated with training a Machine Learning (ML) model; determine that results of first model computations are available to compute gradients utilized to train the ML model, the first model computations among the model training computations and performed by a first training worker among a plurality of model training workers included in computing system to execute the ML model; dispatch, responsive to determining that results of the first model computations are available to compute gradients, a first gradient compute worker, among the plurality of model training workers, to compute, using the results of the first model computations, a first set of gradients; determine that the first set of gradients is available to synchronize; and, dispatch, responsive to determining that the first set of gradients is available to synchronize, a first gradient sync worker to compute, based on the first set of gradients, concurrent with the first gradient compute worker computing a second set of gradients, a first gradient sum comprising a sum of gradients among the first set of gradients.

Example Implementation 11

The example of implementation 10, wherein the program instructions are executable by the at least one processor further cause the at least one processor to: determine that results of second model computations, are available to compute gradients, the second model computations among the model training computations and performed by a second training worker among the plurality of model training workers; dispatch, responsive to determining that results of the second model computations are available to compute gradients, a second gradient compute worker, among the plurality of model training workers, to compute, using the results of the second model computations, a second set of gradients; determine that the second set of gradients is available to synchronize; dispatch, responsive to determining that the second set of gradients is available to synchronize, a second gradient sync worker to compute, based on the second set of gradients, concurrent with the second gradient compute worker computing a third set of gradients, a second gradient sum comprising a sum of gradients among the second set of gradients; determine that the first gradient sync worker has computed the first gradient sum and that the second gradient sync worker has computed the second gradient sum; and, dispatch, responsive to determining that the first gradient sync worker has computed the first gradient sum and that the second gradient sync worker has computed the second gradient sum, a third gradient sync worker, among the plurality of model training workers, to compute a first synchronized gradient using the first gradient sum and the second gradient sum.

Example Implementation 12

A computing system comprises hardware resources comprising a plurality of hardware processors, processor interconnections communicatively coupling processors among the plurality of hardware processors, a plurality of model training workers configured to execute utilizing hardware resources among the hardware resources of the computing system, and a Gradient Sync Overlap (GSO) orchestrator configured to:

determine model training computations associated with training a Machine Learning (ML) model; determine that results of first model computations are available to compute gradients of model parameters utilized to train the ML model, the first model computations among the model training computations and performed by a first training worker among the plurality of model training workers included in the computing system; dispatch, responsive to determining that results of the first model computations are available to compute gradients, a first gradient compute worker, among the plurality of model training workers, to compute, using the results of the first model computations, a first set of gradients; determine that the first set of gradients is available to synchronize; and, dispatch, responsive to determining that the first set of gradients is available to synchronize, a first gradient sync worker to compute, based on the first set of gradients, concurrent with the first gradient compute worker computing a second set of gradients, a first gradient sum comprising a sum of gradients among the first set of gradients.

Example Implementation 13

The example of implementation 12, wherein the GSO orchestrator is further configured to: determine that results of second model computations, are available to compute gradients, the second model computations among the model training computations and performed by a second training worker among the plurality of model training workers; dispatch, responsive to determining that results of the second model computations are available to compute gradients, a second gradient compute worker, among the plurality of model training workers, to compute, using the results of the second model computations, a second set of gradients; determine that the second set of gradients is available to synchronize; and, dispatch, responsive to determining that the second set of gradients is available to synchronize, a second gradient sync worker to compute, based on the second set of gradients, concurrent with one of the first gradient compute worker and the second gradient compute worker computing a third set of gradients, a second gradient sum comprising a sum of gradients among the second set of gradients.

Example Implementation 14

The example of implementation 13, wherein the GSO orchestrator is further configured to: determine that the first gradient sync worker has computed the first gradient sum and that the second gradient sync worker has computed the second gradient sum; and, dispatch, responsive to determining that the first gradient sync worker has computed the first gradient sum and that the second gradient sync worker has computed the second gradient sum, a third gradient sync worker, among the plurality of model training workers, to compute a first synchronized gradient using the first gradient sum and the second gradient sum.

Example Implementation 15

The example of implementation 14, wherein the GSO orchestrator is further configured to: determine that the third gradient sync worker has computed the first synchronized gradient; and, dispatch, responsive to determining that the third gradient sync worker has computed the first synchronized gradient, an optimization worker, among the plurality of model training workers, to compute, concurrent with the third gradient sync worker computing a second synchronized gradient, an optimized model parameter included in the model parameters.

Example Implementation 16

The example of implementation 14, wherein the GSO orchestrator is further configured to: determine that one of the first gradient sync worker, the second gradient sync worker, and the third gradient sync worker is to use first hardware resources among hardware resources of the computing system; determine that a training worker, among the plurality of model training workers, is to use second hardware resources among the hardware resources of the computing system; determine that the first hardware resources comprise at least some of the second hardware resources; and, interleave, responsive to determining that the first hardware resources comprise the second hardware resources, use of the second hardware resources by the training worker and use of the second hardware resources by the one of the first gradient sync worker, the second gradient sync worker, and the third gradient sync worker.

Example Implementation 17

The example of implementation 16, wherein the GSO orchestrator configured to interleave the use of the second hardware resources by the training worker and use of the second hardware resources by the one of the first gradient sync worker, the second gradient sync worker, and the third gradient sync worker comprises the GSO orchestrator further configured to preempt the use of the second hardware resources by the training worker, and dispatch the one of the first gradient sync worker, the second gradient sync worker, and the third gradient sync worker.

Example Implementation 18

The example of implementation 12, wherein the first training worker is configured to perform the first model computations using first hardware resources among hardware resources of the computing system; wherein the first gradient compute worker is configured to compute the first set of gradients using second hardware resources among the hardware resources of the computing system; and, wherein the GSO orchestrator is further configured to initiate a transfer of a portion of the results of the first model computations available to compute gradients from the first hardware resources to the second hardware resources, and to initiate the transfer to occur concurrently with the first training worker performing second model computations among the model training computations.

Example Implementation 19

The example of implementation 12, wherein the first gradient compute worker is configured to compute the first set of gradients using first hardware resources among hardware resources of the computing system; wherein the first gradient sync worker is configured to compute the first gradient sum using second hardware resources among hardware resources of the computing system; and, wherein the GSO orchestrator is further configured to initiate a transfer, of second gradients, among the first set of gradients, from the first hardware resources to the second hardware resources, and to initiate the transfer to occur concurrently with first gradient compute worker computing first gradients among the first set of gradients.

Example Implementation 20

The example of implementation 12, wherein computing system further comprises a runtime component configured to execute training workers, among the plurality of model training workers, using the hardware resources of the computing system; and, wherein the GSO orchestrator configured to dispatch the first gradient sync worker comprises the GSO orchestrator further configured to communicate to the runtime component to execute the first gradient sync worker using the hardware resources of the computing system.

What is claimed is:

1. A method, the method comprising:

determining, by a Gradient-Sync Overlap (GSO) orchestrator included in a computing system, model training computations associated with training a Machine Learning (ML) model;

determining, by the GSO orchestrator, that results of first model computations are available to compute gradients of model parameters utilized to train the ML model, the first model computations among the model training computations and performed by a first training worker among a plurality of model training workers included in the computing system;

dispatching, by the GSO orchestrator, responsive to the determining that results of the first model computations are available to compute gradients, a first gradient compute worker, among the plurality of model training workers, to compute, using the results of the first model computations, a first set of gradients;

determining, by the GSO orchestrator, that the first set of gradients is available to synchronize; and, dispatching, by the GSO orchestrator, responsive to the determining that the first set of gradients is available to synchronize, a first gradient sync worker to compute, based on the first set of gradients, concurrent with the first gradient compute worker computing a second set of gradients, a first gradient sum comprising a sum of gradients among the first set of gradients;

determining, by the GSO orchestrator, that a second gradient sum is available, the second gradient sum comprising a sum of gradients among a second set of gradients computed by a second gradient sync worker; and dispatching, by the GSO orchestrator, responsive to determining that the first gradient sum and the second gradient sum are available, a third gradient sync worker, among the plurality of model training workers, to compute a first synchronized gradient by averaging a combined gradient sum formed from the first gradient sum and the second gradient sum.

2. The method of claim 1, wherein the method further comprises:

determining, by the GSO orchestrator, that the third gradient sync worker has computed the first synchronized gradient; and, dispatching, by the GSO orchestrator, responsive to the GSO orchestrator determining that the third gradient sync worker has computed the first synchronized gradient, an optimization worker, among the plurality of model training workers, to compute, concurrent with the third gradient sync worker computing a second synchronized gradient, an optimized model parameter included in the model parameters.

3. The method of claim 1, wherein the method further comprises:

determining, by the GSO orchestrator, that one of the first gradient sync worker, the second gradient sync worker, and the third gradient sync worker is to use first hardware resources among hardware resources of the computing system;

determining, by the GSO orchestrator, that a training worker, among the plurality of model training workers, is to use second hardware resources among the hardware resources of the computing system;

determining, by the GSO orchestrator, that the first hardware resources comprise at least some of the second hardware resources; and, interleaving, by the GSO orchestrator, responsive to the determining that the first hardware resources comprise the second hardware resources, use of the second hardware resources by the training worker and use of the second hardware resources by the one of the first gradient sync worker, the second gradient sync worker, and the third gradient sync worker.

4. The method of claim 3, wherein the method of the GSO orchestrator interleaving the use of the second hardware resources by the training worker and use of the second hardware resources by the one of the first gradient sync worker, the second gradient sync worker, and the third gradient sync worker comprises:

preempting, by the GSO orchestrator, the use of the second hardware resources by the training worker, and dispatching, by the GSO orchestrator, the one of the first gradient sync worker, the second gradient sync worker, and the third gradient sync worker.

5. The method of claim 1, wherein the first training worker is configured to perform the first model computations using first hardware resources among hardware resources of the computing system;

wherein the first gradient compute worker is configured to compute the first set of gradients using second hardware resources among the hardware resources of the computing system; and, wherein the method further comprises initiating, by the GSO orchestrator, a transfer of a portion of the results of the first model computations available to compute gradients from the first hardware resources to the second hardware resources, the GSO orchestrator initiating the transfer to occur concurrently with the first training worker performing second model computations among the model training computations.

6. The method of claim 1, wherein the first gradient compute worker is configured to compute the first set of gradients using first hardware resources among hardware resources of the computing system;

wherein the first gradient sync worker is configured to compute the first gradient sum using second hardware resources among the hardware resources of the computing system; and, wherein the method further comprises initiating, by the GSO orchestrator, a transfer of second gradients, among the first set of gradients, from the first hardware resources to the second hardware resources, the GSO orchestrator initiating the transfer to occur concurrently with the first gradient compute worker computing first gradients among the first set of gradients.

7. The method of claim 1, wherein computing system comprises a runtime component configured to execute training workers, among the plurality of model training workers, using hardware resources of the computing system; and, wherein the method of the GSO orchestrator dispatching the first gradient sync worker comprises the GSO orchestrator communicating to the runtime component to execute the first gradient sync worker using the hardware resources of the computing system.

8. A computer program product, the computer program product comprising a computer readable storage medium having program instructions embodied therewith, wherein the program instructions are executable by at least one processor to cause the at least one processor to:

determine, by a Gradient-Sync Overlap (GSO) orchestrator, model training computations associated with training a Machine Learning (ML) model;

determine that results of first model computations are available to compute gradients utilized to train the ML model, the first model computations among the model training computations and performed by a first training worker among a plurality of model training workers included in computing system to execute the ML model;

dispatch, responsive to determining that results of the first model computations are available to compute gradients, a first gradient compute worker, among the plurality of model training workers, to compute, using the results of the first model computations, a first set of gradients;

determine that the first set of gradients is available to synchronize; and, dispatch, responsive to determining that the first set of gradients is available to synchronize, a first gradient sync worker to compute, based on the first set of gradients, concurrent with the first gradient compute worker computing a second set of gradients, a first gradient sum comprising a sum of gradients among the first set of gradients;

determining, by the GSO orchestrator, that a second gradient sum is available, the second gradient sum comprising a sum of gradients among a second set of gradients computed by a second gradient sync worker; and dispatching, by the GSO orchestrator, responsive to determining that the first gradient sum and the second gradient sum are available, a third gradient sync worker, among the plurality of model training workers, to compute a first synchronized gradient by averaging a combined gradient sum formed from the first gradient sum and the second gradient sum.

9. A computing system, the system comprising:

hardware resources comprising a plurality of hardware processors, processor interconnections communicatively coupling processors among the plurality of hardware processors, a plurality of model training workers configured to execute utilizing hardware resources among the hardware resources of the computing system, and a Gradient Sync Overlap (GSO) orchestrator configured to:

determine model training computations associated with training a Machine Learning (ML) model;

determine that results of first model computations are available to compute gradients of model parameters utilized to train the ML model, the first model computations among the model training computations and performed by a first training worker among the plurality of model training workers included in the computing system;

dispatch, responsive to determining that results of the first model computations are available to compute gradients, a first gradient compute worker, among the plurality of model training workers, to compute, using the results of the first model computations, a first set of gradients;

determine that the first set of gradients is available to synchronize; and, dispatch, responsive to determining that the first set of gradients is available to synchronize, a first gradient sync worker to compute, based on the first set of gradients, concurrent with the first gradient compute worker computing a second set of gradients, a first gradient sum comprising a sum of gradients among the first set of gradients-;

determining, by the GSO orchestrator, that a second gradient sum is available, the second gradient sum comprising a sum of gradients among a second set of gradients computed by a second gradient sync worker; and dispatching, by the GSO orchestrator, responsive to determining that the first gradient sum and the second gradient sum are available, a third gradient sync worker, among the plurality of model training workers, to compute a first synchronized gradient by averaging a combined gradient sum formed from the first gradient sum and the second gradient sum.

10. The computing system of claim 9, wherein the GSO orchestrator is further configured to:

determine that the third gradient sync worker has computed the first synchronized gradient; and, dispatch, responsive to determining that the third gradient sync worker has computed the first synchronized gradient, an optimization worker, among the plurality of model training workers, to compute, concurrent with the third gradient sync worker computing a second synchronized gradient, an optimized model parameter included in the model parameters.

11. The computing system of claim 9, wherein the GSO orchestrator is further configured to:

determine that one of the first gradient sync worker, the second gradient sync worker, and the third gradient sync worker is to use first hardware resources among hardware resources of the computing system;

determine that a training worker, among the plurality of model training workers, is to use second hardware resources among the hardware resources of the computing system;

determine that the first hardware resources comprise at least some of the second hardware resources; and, interleave, responsive to determining that the first hardware resources comprise the second hardware resources, use of the second hardware resources by the training worker and use of the second hardware resources by the one of the first gradient sync worker, the second gradient sync worker, and the third gradient sync worker.

12. The computing system of claim 11, wherein the GSO orchestrator configured to interleave the use of the second hardware resources by the training worker and use of the second hardware resources by the one of the first gradient sync worker, the second gradient sync worker, and the third gradient sync worker comprises the GSO orchestrator further configured to:

preempt the use of the second hardware resources by the training worker, and dispatch the one of the first gradient sync worker, the second gradient sync worker, and the third gradient sync worker.

13. The computing system of claim 9, wherein the first training worker is configured to perform the first model computations using first hardware resources among hardware resources of the computing system;

wherein the first gradient compute worker is configured to compute the first set of gradients using second hardware resources among the hardware resources of the computing system; and, wherein the GSO orchestrator is further configured to:

initiate a transfer of a portion of the results of the first model computations available to compute gradients from the first hardware resources to the second hardware resources, and to initiate the transfer to occur concurrently with the first training worker performing second model computations among the model training computations.

14. The computing system of claim 9, wherein the first gradient compute worker is configured to compute the first set of gradients using first hardware resources among hardware resources of the computing system;

wherein the first gradient sync worker is configured to compute the first gradient sum using second hardware resources among hardware resources of the computing system; and, wherein the GSO orchestrator is further configured to:

initiate a transfer, of second gradients, among the first set of gradients, from the first hardware resources to the second hardware resources, and to initiate the transfer to occur concurrently with the first gradient compute worker computing first gradients among the first set of gradients.

15. The computing system of claim 9, wherein computing system further comprises a runtime component configured to execute training workers, among the plurality of model training workers, using the hardware resources of the computing system; and, wherein the GSO orchestrator configured to dispatch the first gradient sync worker comprises the GSO orchestrator further configured to communicate to the runtime component to execute the first gradient sync worker using the hardware resources of the computing system.

* * * * *